(12) United States Patent
Pfannschmidt

(10) Patent No.: US 7,555,988 B2
(45) Date of Patent: Jul. 7, 2009

(54) GUIDEWAY FOR A MAGLEV VEHICLE

(75) Inventor: Bernd Pfannschmidt, Rosstal (DE)

(73) Assignee: Siemens Aktiengesellschaft, München (DE)

( * ) Notice: Subject to any disclaimer, the term of this patent is extended or adjusted under 35 U.S.C. 154(b) by 606 days.

(21) Appl. No.: 10/542,478

(22) PCT Filed: Dec. 19, 2003

(86) PCT No.: PCT/DE03/04208

§ 371 (c)(1),
(2), (4) Date: Sep. 26, 2005

(87) PCT Pub. No.: WO2004/067844

PCT Pub. Date: Aug. 12, 2004

(65) Prior Publication Data

US 2006/0054050 A1   Mar. 16, 2006

(51) Int. Cl.
*B60L 13/00* (2006.01)

(52) U.S. Cl. .................................. 104/281; 104/286

(58) Field of Classification Search ............... 104/286, 104/281, 282, 283; 310/13
See application file for complete search history.

(56) References Cited

U.S. PATENT DOCUMENTS 3,967,561 A * 7/1976 Schwarzler ............... 104/294
5,370,059 A * 12/1994 Raschbichler et al. ....... 104/124

FOREIGN PATENT DOCUMENTS

| DE | 196 19 867 A1 | 11/1997 |
| DE | 199 31 367 A1 | 1/2001 |
| EP | 0 987 370 A | 3/2000 |
| JP | 09 037413 A | 2/1997 |
| WO | WO 2004/044329 | 5/2004 |

* cited by examiner

*Primary Examiner*—Mark T Le
(74) *Attorney, Agent, or Firm*—Henry M. Feiereisen; Ursula B. Day

(57) ABSTRACT

In order to provide an easy-to-assemble support structure of a guideway of a maglev vehicle, pre-fabricated stator lamination stacks (4) and guideway beam (1) are joined together to the support structure.

6 Claims, 3 Drawing Sheets

GUIDEWAY FOR A MAGLEV VEHICLE

BACKGROUND OF THE INVENTION

The invention relates to a guideway beam, a stator lamination stack as well as to the support structure of a guideway of a maglev vehicle with a guideway beam and stator lamination stacks, and to a method of making a support structure for a guideway of a maglev vehicle.

Guideways for maglev vehicles include a plurality of support structures arranged successively along a route and provided for attachment of all equipment parts, such as functional areas or lateral guidance rails, which are necessary for the operation of such a vehicle, in particular the support, guidance, propulsion and braking. Support structures are hereby positioned onto posts anchored in foundations. The equipment parts of a maglev vehicle are secured on the beams by providing dovetail grooves upon the back of a stator lamination stack which are formed in respective counter pieces of steel which in turn engage in a respective opposite dovetail piece on the beam.

A drawback thereof is hereby that the back of the stator lamination stacks is subject to a weakening of its geometry as a consequence of the open dovetail grooves. There is thus the risk of damaging resonances during operation of the maglev vehicle.

Furthermore, when mounting the stator lamination stacks, in particular when several suspensions per stator lamination stack are involved, there are problems to maintain respective tolerances in axial direction. Heretofore, these problems could only be eliminated by providing respective clearances in the dovetail connections. The additional, undesired clearance is hereby to be filled by filler compound.

SUMMARY OF THE INVENTION

The invention is thus based on the object to provide an easy-to-assemble support structure for a guideway of a maglev vehicle, which can easily be assembled and can easily be replaced in case of need.

The support structure according to the invention includes a guideway beam and a stator lamination stack. The guideway beam includes, i.a., means for positioning and securement to a base support which is configured in particular as concrete beam and establishes the necessary connection to the ground via pilings and foundations. The guideway beam is further provided with a U-shaped section pointing in the direction of the stator lamination stack. When the stator lamination stack is installed into the guideway beam, the stator lamination stack is surrounded, at least partially, by the legs of the U section.

The stator lamination stack is provided with laminations which are stacked transversely to the travel direction of the maglev vehicle and advantageously coated. Furthermore, this stator lamination stack includes besides the grooves, which point to the functional area of the guideway and are provided for receiving the coils, aligned openings, especially bores, on the back of the laminations for serving a later securement of this stator lamination stack upon the guideway beam. The securement of the laminations of the stator lamination stack is realized by end plates on the end surfaces of the stator lamination stacks and/or special locking rings or weld seams so that the stator lamination stack is under pressure and thus ingress of liquids or dirt particles is rendered difficult.

Advantageously, the entire stator lamination stack can be impregnated and/or cast so that ingress of liquids is rendered even more difficult.

The support structure of the guideway is made as follows: The stator lamination stack is inserted from below into the U section of the guideway beam so that the legs of the U section surround, at least partially, the end surfaces of the stator lamination stack. The load-bearing bolts provided in the openings of the stator lamination stack engage hereby in openings of the legs of the U section and are secured by preferably sleeve-shaped fastening elements. The diameter of the opening of a U section leg is greater than the outer diameter of the load-bearing bolt so that fastening elements are required for mounting and securing the stator lamination stack to the guideway beam and so arranged as to prevent the stator lamination stack from falling out of the opening.

The openings in the legs of the U section as well as the slots in the legs of the U section can be made by milling or flame cutting. Advantageously, the connection of the ready-to-install stator lamination stacks to the guideway beam is facilitated by respective devices. In this way, the guideway beam can be placed more easily from atop onto the stator lamination stacks, with the device assuring a positioning of the openings of the guideway beam with respect to the guideway to the stator lamination stack in a predetermined manner. This is required in order to establish an optimum minimal air gap between the maglev vehicle and the functional area of the guideway for application in the field of magnetic levitation.

The thus finished guideway element with stator lamination stack and guideway beam ensures that the openings in the guideway beam for the stator lamination stack are sufficiently aligned with the fastening holes of the guideway beam to the base support.

After the guideway beam is placed upon the stator lamination stack, fastening elements are inserted on both sides of the end surfaces of the stator lamination stack onto the load-bearing bolts and into the bores of the guideway beam. Advantageously, these fastening elements can be equipped at interference fit upon the load-bearing bolts, or the fastening elements can be fixed by welding with the load-bearing bolts. Clearance is advantageously provided between the fastening elements and the openings in the guideway beam to compensate the tolerances caused by the manufacture.

The fastening elements assure that the stator lamination stack is sufficiently secured against falling out of the guideway beam. The press fit within the stator lamination stack is assured so that the stator lamination stack is held even when attempts are undertaken to intentionally cause damage.

The lateral guidance of the stator lamination stack in the guideway beam and the vertical securement of the stator lamination stack are ensured by weld seams between the fastening elements and the guideway beam.

According to a further embodiment, collars on the fastening elements strike against the outer sides of the guideway to also provide a lateral guidance of the stator lamination stack in the guideway beam. The vertical guidance may also be implemented by manufacturing the seat with precision fit between the fastening elements and the guideway beam. As an alternative to welding, it may also be conceivable to bolt or pin the fastening elements to the guideway beam.

In the event of a failure of the weld seams, the stator lamination stack drops into the clearance between the fastening elements and the guideway beam. This clearance is sized small at about 1 to 2 mm so that the maglev vehicles continue to operate without danger.

The coils, arranged in the slots of the stator lamination stack, are advantageously covered by coil caps so that the winding heads on both sides of the stator lamination stack are situated in a continuous space formed in movement direction of the maglev vehicle. The coil cap may hereby be made of one or more plastic materials or other materials and secured to the stator lamination stack and/or guideway beam. Likewise, a cover may be constructed by utilizing the guideway profiles and optional additional lids.

In the presence of a particular intense thermal stress, the space, defining the coil cap about the winding heads, may be connected to a cooling air supply by which cooling air flows through this space to thereby cool the coil.

The stator lamination stacks may be manufactured together with the guideway beam as an independent unit. Thus, it is merely required to loosen only the fasteners of the guideway beam to a base support or to replace them in case of maintenance.

BRIEF DESCRIPTION OF THE DRAWING

The invention as well as advantageous configurations of the invention according to features set forth in the sub-claims will now be described in more detail with reference to exemplified embodiment which is schematically illustrated in the drawing, in which:

DETAILED DESCRIPTION OF THE PREFERRED EMBODIMENTS

Figure 1:
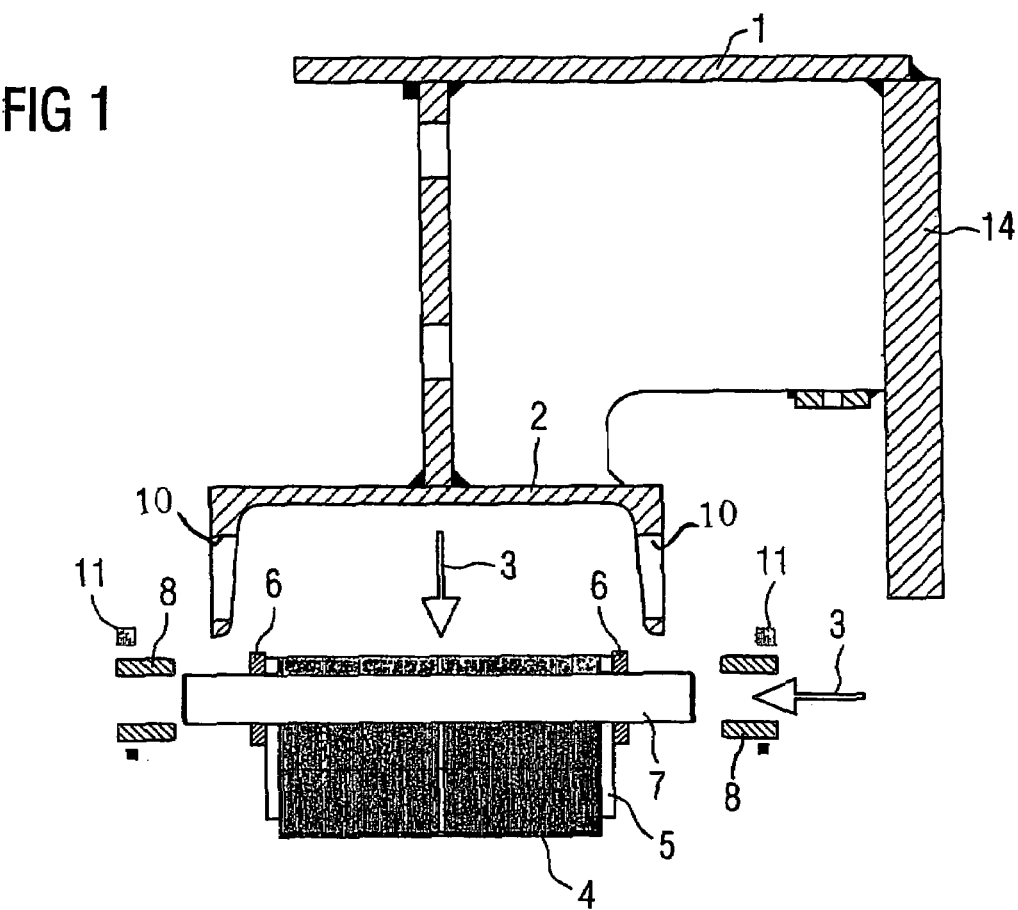
FIGS. 1, 2 show the principal assembly of a support structure according to the invention, FIG. 3 show the support structure in assembled state.

FIG. 1 shows a guideway beam 1 which is welded together from several simple geometric basic shapes, such as plates or U sections. The U section 2 embraces at least partially a stator lamination stack 4 which is joined together by end plates 5 and stator lamination mountings 6. The stator lamination stack 4 further includes a load-bearing bolt 7 which is inserted through provided openings in the stator lamination stack 4. The load-bearing bolt 7 projects beyond the end surfaces of the stator lamination stack 4 to such an extent as to be able to reliably receive the fastening elements 8. Overhangs of about 50 to 100 mm are hereby advantageous. After the stator lamination stack 4 provided with the load-bearing bolt 7 has been inserted in slots 9 of the guideway beam 1 in accordance with arrow 3, the load-bearing bolt 7 is located in the opening 10 of the guideway beam 1. Additional fastening elements 8 prevent the stator lamination stack 4 from falling out of the opening 10. Additional welded connections 11 secure the stator lamination stack 4 with its load-bearing bolt 7 to the guideway beam 1 and thus upon the U section 2. Advantageously, the fastening elements 8 include a stop which is not shown in more detail and facilitates the securement and positioning of the fastening elements 8 upon the load-bearing bolt 7.

Figure 2:
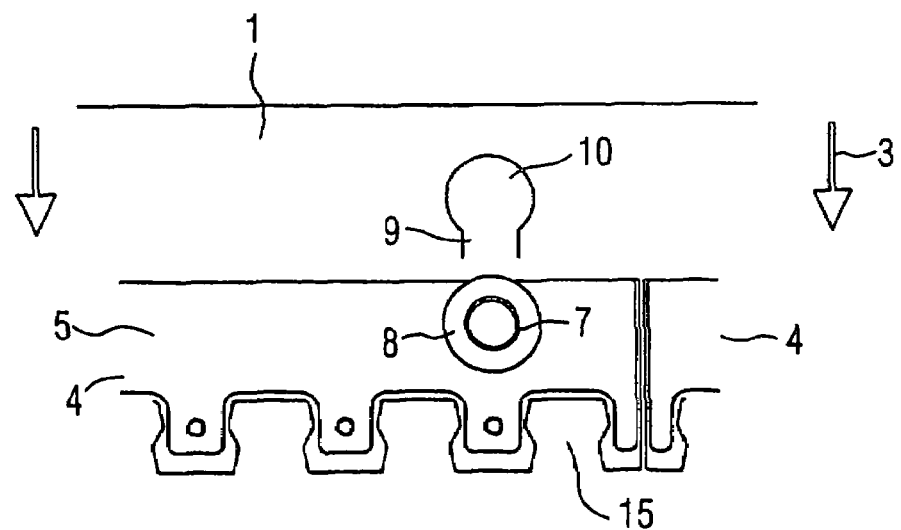

FIG. 2 shows a side view of the joining operation of the stator lamination stack 4 in the guideway beam 1. The end plates 5 of the stator lamination stack 4 have substantially the same cross section as the single stator laminations, configured as dynamo sheets, of the stator lamination stack 4.

Figure 3:
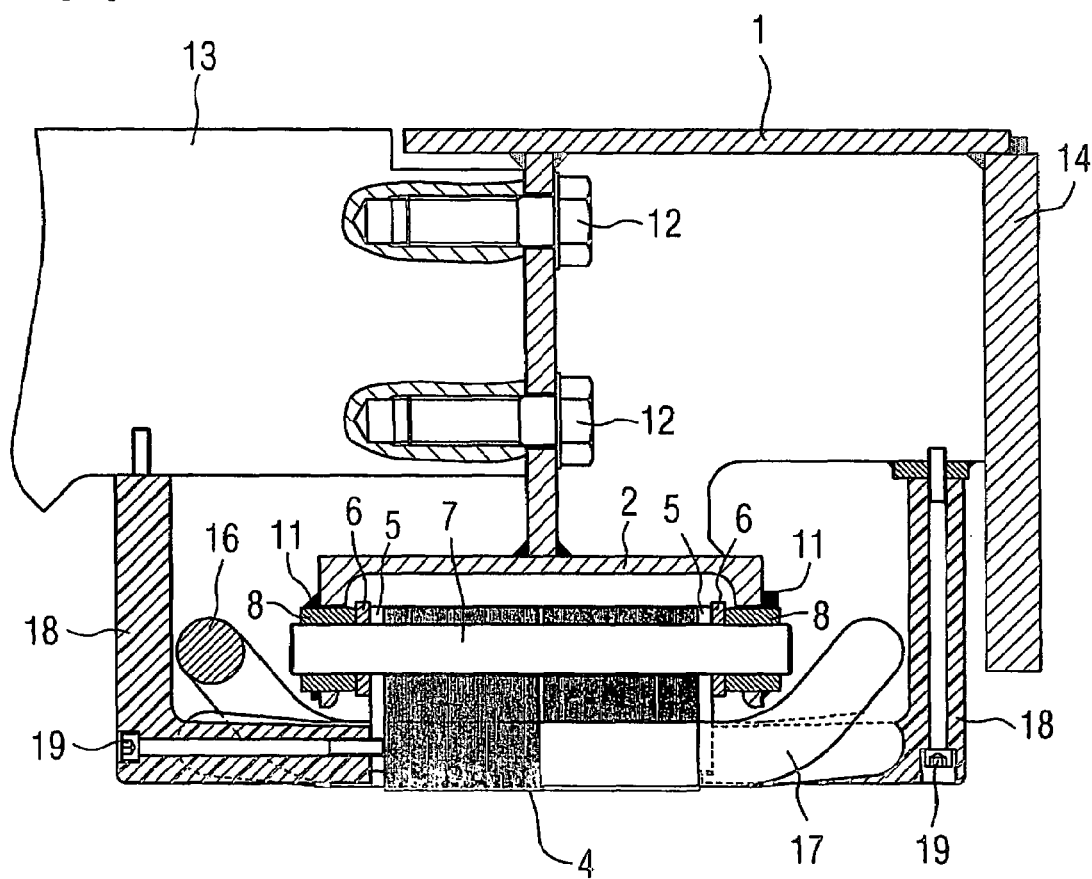

FIG. 3 shows the assembled state of the guideway of a maglev vehicle made of the components guideway beam and stator lamination stack. The guideway beam 1 is hereby secured at predefined distances to a base support 13 by bolts 12. The base support 13 may be configured as concrete beam or steel beam. A guide rail 14 is further disposed on the guideway beam 1. FIG. 3 shows moreover the coils 16 disposed in the slots 15 of the stator lamination stack 4 and forming a winding head 17 at each of the end surfaces of the stator lamination stack 4. The winding heads 17 may advantageously be enclosed by caps 18 which are secured by respective bolt connections 19 to the guideway beam 1 and/or stator lamination stack 4. Openings in the caps 18 improve cooling in the area of the coil heads. The cooling effect can be further improved by suitable fans which increase the air exchange in the caps 18.

Figure 4:
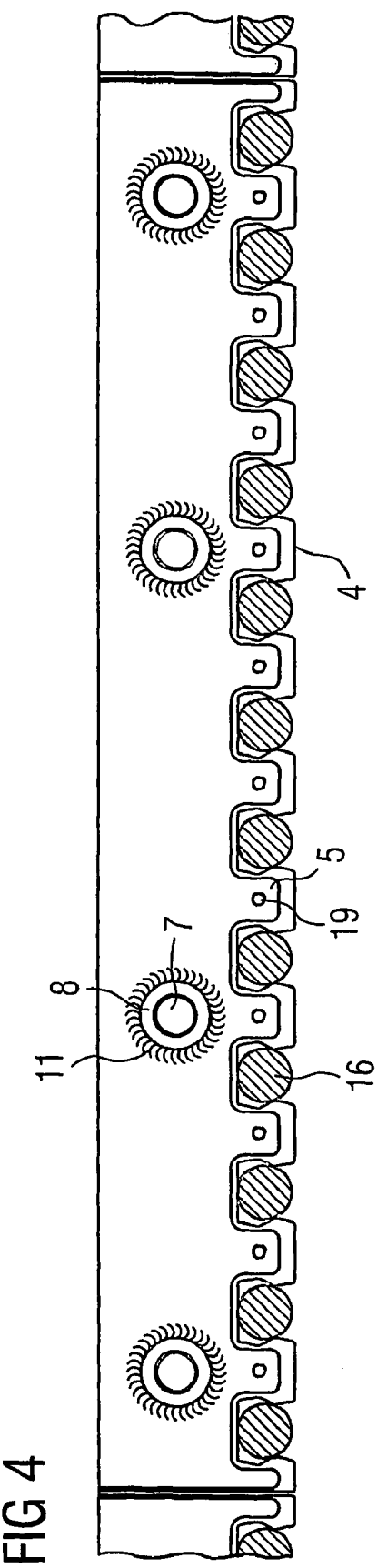
FIGS. 4, 5 show side views of a support structure according to the invention.
Figure 5:
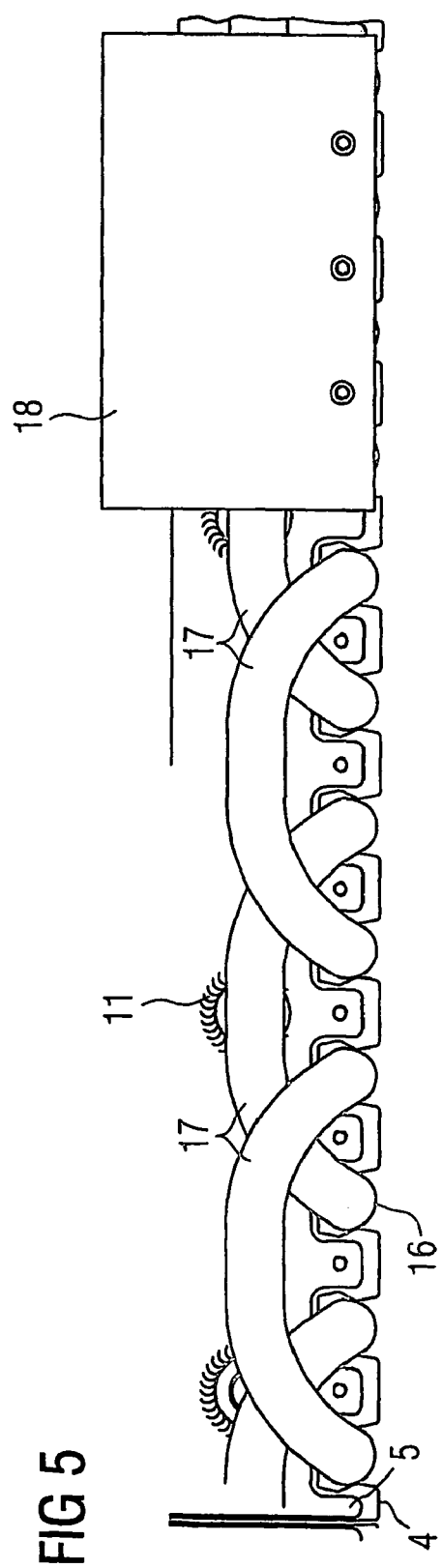

FIGS. 4 and 5 show each the assembled guideway construction. Advantageously, the coils snap into the slots 15.

Guideway beam 1 as well as stator lamination stack 4 may be produced completely separately from one another. Likewise, the support structure may be made completely separately from these parts. The entire functional area of the maglev vehicle is thus formed of individual elements which can be joined together beforehand and mounted or replaced on site in a relatively simple manner. Only the bolts 12 need to be loosened from the base support 13.

What is claimed is:

1. Method of making a support structure for a guideway of a maglev vehicle, comprising the steps of:
   providing a stator lamination stack by interlocking stacked and stamped stator laminations according to predefined stamping patterns with aligned openings on a backside thereof,
   placing end plates at end surfaces of the stator lamination stack,
   inserting load-bearing bolts into the openings of the stator lamination stack,
   urging means for holding the stator lamination stack under pressure against the end plates,
   inserting the stator lamination stack with the load-bearing bolts into openings of a U section of a guideway beam, and
   securing the load-bearing bolts to the U section of the guideway beam.

2. Method according to claim 1, wherein the stator lamination stack is treated prior to insertion into the U section by a casting process.

3. Method according to claim 1, wherein the load-bearing bolts are secured to the guideway beam by an interference fit of fastening elements in a space between the load-bearing bolts and the openings of the U section.

4. Method according to claim 1, wherein the stator lamination stack is treated prior to insertion into the U by an impregnation process.

5. Method according to claim 1, wherein the load-bearing bolts are secured to the guideway beam by welding fastening elements to the U section.

6. Method according to claim 1, wherein the opening of the U section are made by milling or flame cutting.

* * * * *

UNITED STATES PATENT AND TRADEMARK OFFICE
CERTIFICATE OF CORRECTION

| | | |
|---|---|---|
| PATENT NO. | : 7,555,988 B2 | Page 1 of 1 |
| APPLICATION NO. | : 10/542478 | |
| DATED | : July 7, 2009 | |
| INVENTOR(S) | : Pfannschmidt | |

It is certified that error appears in the above-identified patent and that said Letters Patent is hereby corrected as shown below:

On the Title Page, after Item "(65) Prior Publication Data", insert

Item
-- (30) Foreign Application Priority Data

January 15, 2003 (DE)......................... 103 01 276 --.

Signed and Sealed this

Twenty-fifth Day of August, 2009

David J. Kappos
*Director of the United States Patent and Trademark Office*